(12) United States Patent
Kim et al.

(10) Patent No.: US 10,308,248 B2
(45) Date of Patent: Jun. 4, 2019

(54) CONTROL APPARATUS AND METHOD FOR IMPROVING FUEL EFFICIENCY IN CACC SYSTEM

(71) Applicants: HYUNDAI MOTOR COMPANY, Seoul (KR); KIA MOTORS CORPORATION, Seoul (KR)

(72) Inventors: Yoon Soo Kim, Suwon-si (KR); Dong Gyu Noh, Dongducheon-si (KR); In Yong Jung, Suwon-si (KR); Su Lyun Sung, Anyang-si (KR); Seung Wook Park, Yongin-si (KR); Jong Rok Park, Seoul (KR); Kyung Joo Bang, Seoul (KR); Cho Rong Ryu, Incheon (KR); Min Byeong Lee, Seongnam-si (KR); Hahk Rel Noh, Bucheon-si (KR); Dae Sung Hwang, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/638,093

(22) Filed: Jun. 29, 2017

(65) Prior Publication Data

US 2018/0001892 A1    Jan. 4, 2018

Related U.S. Application Data

(63) Continuation-in-part of application No. 15/368,023, filed on Dec. 2, 2016.

(30) Foreign Application Priority Data

Jul. 1, 2016  (KR) .................. 10-2016-0083493
Dec. 30, 2016 (KR) .................. 10-2016-0184301

(51) Int. Cl.
*B60W 30/14* (2006.01)
*B60W 30/16* (2012.01)
(Continued)

(52) U.S. Cl.
CPC ........ *B60W 30/143* (2013.01); *B60W 30/095* (2013.01); *B60W 30/0953* (2013.01);
(Continued)

(58) Field of Classification Search
CPC ............ B60K 31/0008; B60K 2310/24; B60K 2310/26; B60K 2310/244;
(Continued)

(56) References Cited

U.S. PATENT DOCUMENTS 8,515,644 B2 *  8/2013  Leineweber .......... B60W 30/16
                                                          701/96
9,333,971 B1 *  5/2016  Han ...................... B60W 30/16
(Continued)

FOREIGN PATENT DOCUMENTS

DE    102008019174 A1    10/2009
JP    2007-008298 A    1/2007
(Continued)

OTHER PUBLICATIONS

U.S. Office Action issued in U.S. Appl. No. 15/368,023 dated Dec. 8, 2017, 7 pages.
(Continued)

*Primary Examiner* — Michael J Zanelli
(74) *Attorney, Agent, or Firm* — Morgan Lewis & Bockius LLP

(57) ABSTRACT

Disclosed herein is a control apparatus and method for improving fuel efficiency in a CACC system, which can improve fuel efficiency through control of a vehicle speed so that a vehicle travels using an optimized cost in consideration of a target vehicle speed, current vehicle speed, mini-
(Continued)

mum driving speed set in the vehicle, and a deceleration distance if the vehicle that uses the CACC system senses a forward vehicle and enters into a CACC active mode. The control method for improving fuel efficiency in a CACC system includes setting a target speed profile based on a target speed of the subject vehicle and an expected driving path, determining whether a target vehicle to be followed by the subject vehicle exists, and controlling the driving speed of the subject vehicle according to the set target speed profile depending on whether or not the target vehicle exists.

13 Claims, 12 Drawing Sheets

(51) Int. Cl.
  *B60W 40/04* (2006.01)
  *B60W 30/095* (2012.01)
(52) U.S. Cl.
  CPC ............ *B60W 30/16* (2013.01); *B60W 40/04* (2013.01); *B60W 2550/30* (2013.01); *B60W 2550/408* (2013.01); *B60W 2720/103* (2013.01); *B60W 2750/30* (2013.01)
(58) Field of Classification Search
  CPC .......... B60K 2031/0025; B60W 30/16; B60W 30/143; B60W 30/0953; B60W 2720/103; B60W 2550/408; B60W 2550/30; B60W 2550/146; B60W 2750/30
  See application file for complete search history.

(56) References Cited

U.S. PATENT DOCUMENTS

| 2004/0068359 | A1 | 4/2004 | Neiss et al. |
| 2015/0019117 | A1 | 1/2015 | Huber et al. |
| 2016/0200320 | A1* | 7/2016 | Nemoto ................ B60W 30/16 701/96 |
| 2016/0304093 | A1* | 10/2016 | Maier ................... B60W 30/16 |
| 2016/0375905 | A1 | 12/2016 | Park et al. |

FOREIGN PATENT DOCUMENTS

| JP | 2013-067365 A | 4/2013 |
| JP | 5434711 B2 | 3/2014 |
| JP | 2014-240233 A | 12/2014 |
| JP | 2015020503 | 2/2015 |
| JP | 2015-080977 A | 4/2015 |
| KR | 10-2011-0060244 A | 6/2011 |
| KR | 10-1315726 B1 | 10/2013 |
| WO | 2012-029178 A1 | 3/2012 |
| WO | 2013-102466 A1 | 7/2013 |

OTHER PUBLICATIONS

Extended European Search Report issued in European Patent Application No. 17188689.8, dated Apr. 5, 2018.
Office Action issued in Korean Patent Application No. 10-2016-0184301, dated Sep. 3, 2018.

* cited by examiner

[Fig. 1]
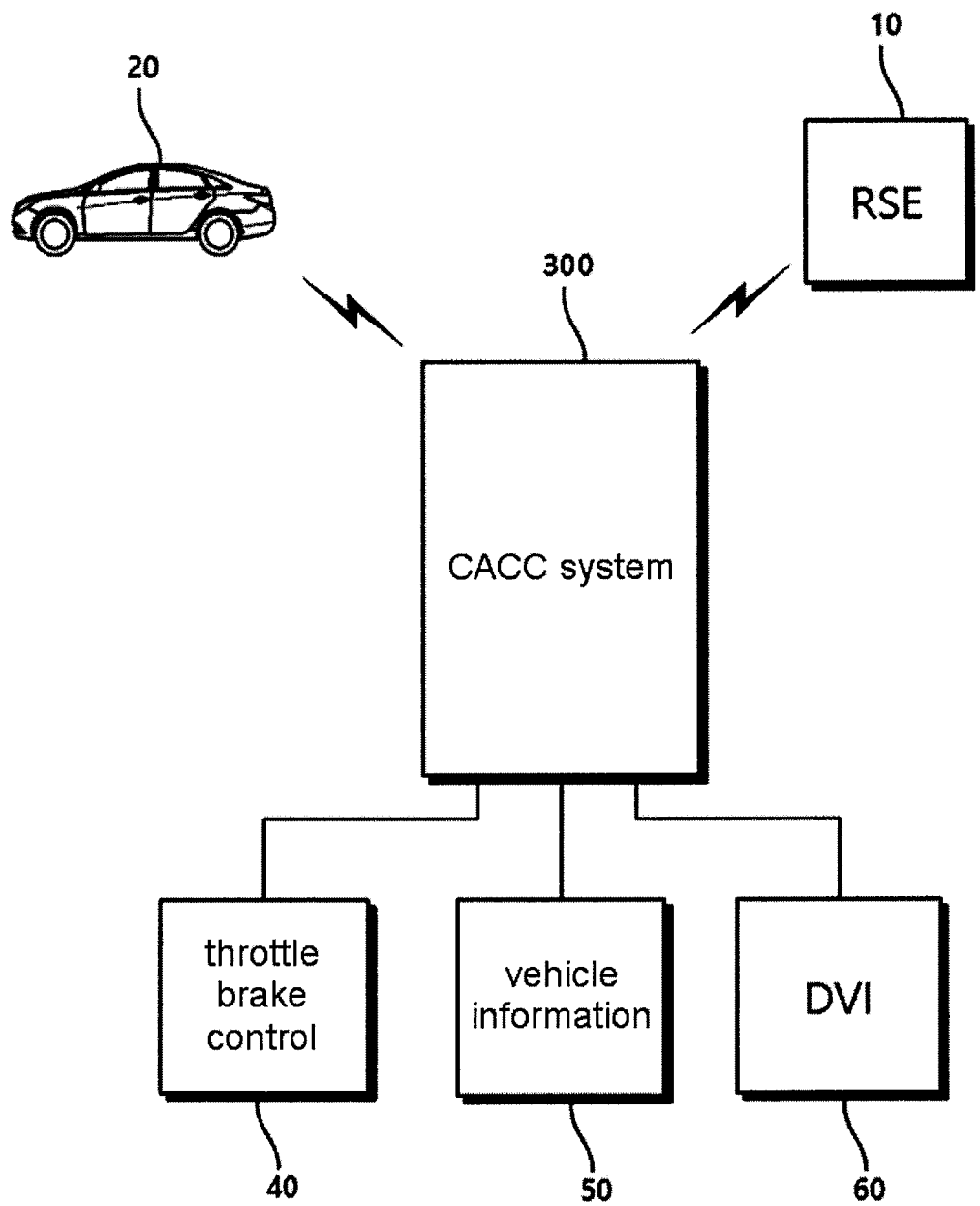

[Fig. 2]
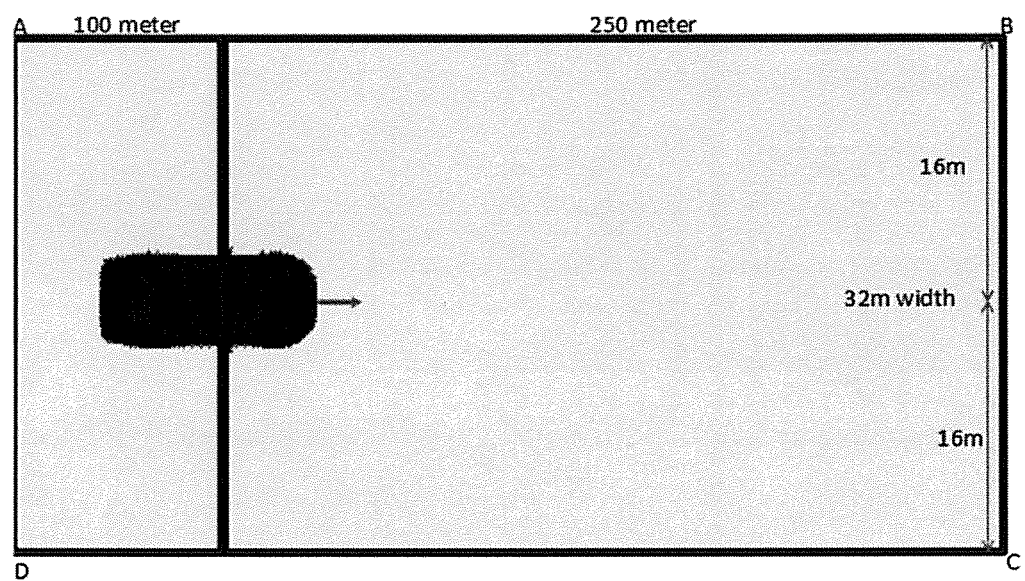

[Fig. 3]
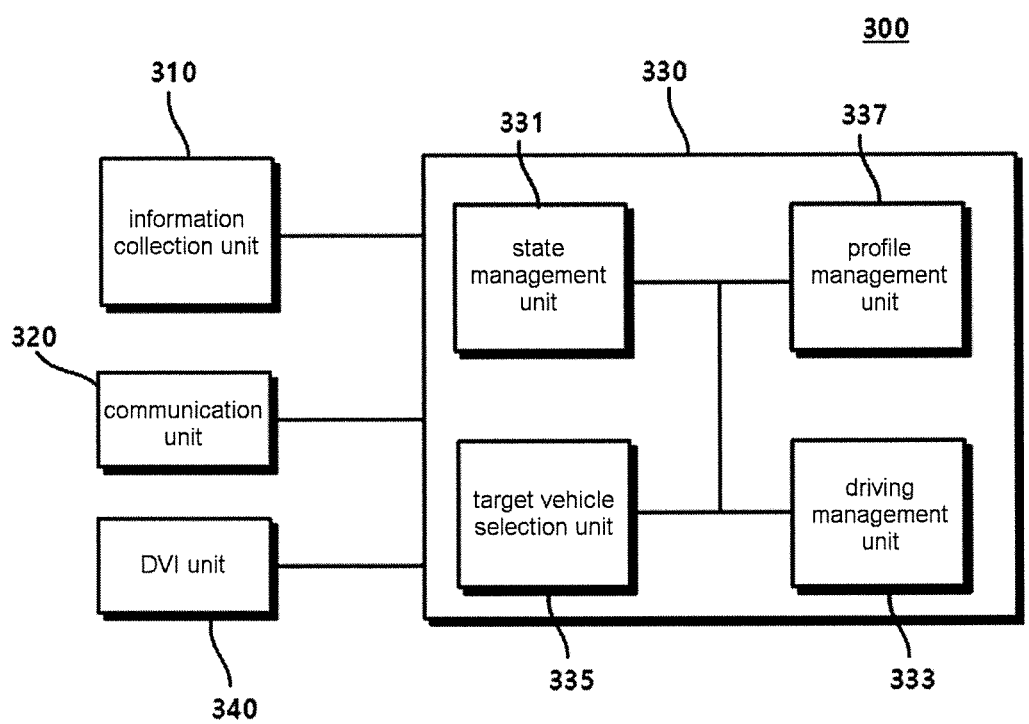

[Fig. 4]
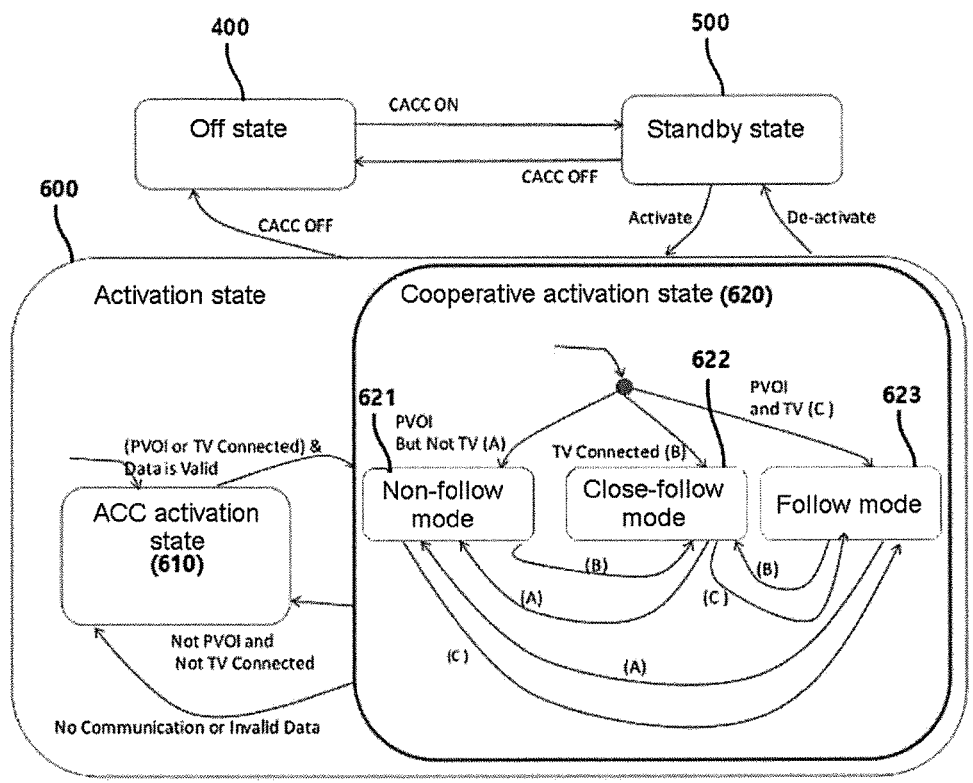

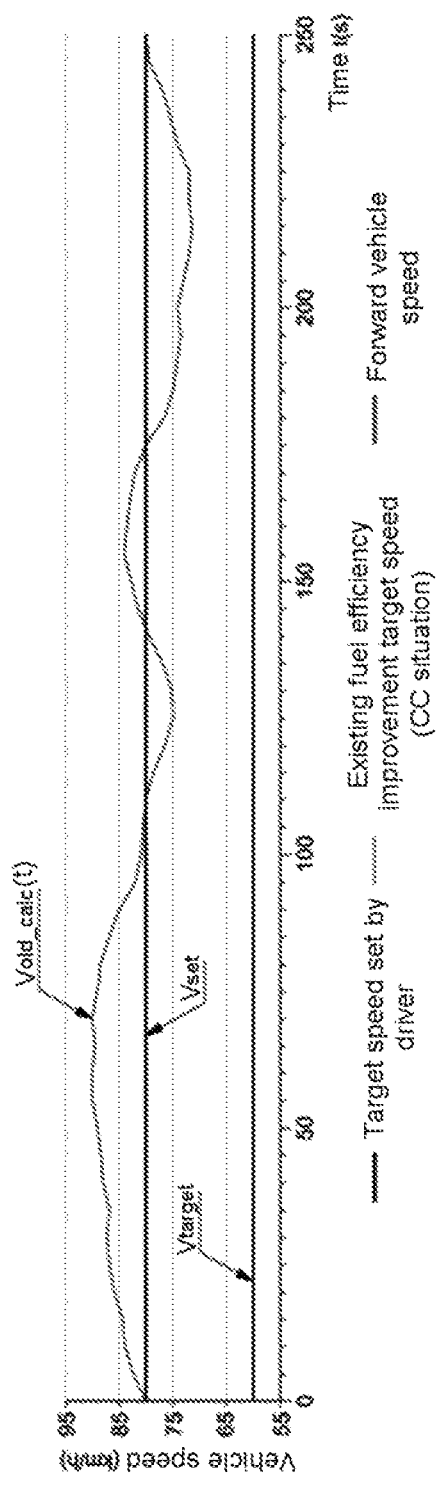
[Fig. 5]

[Fig. 6]
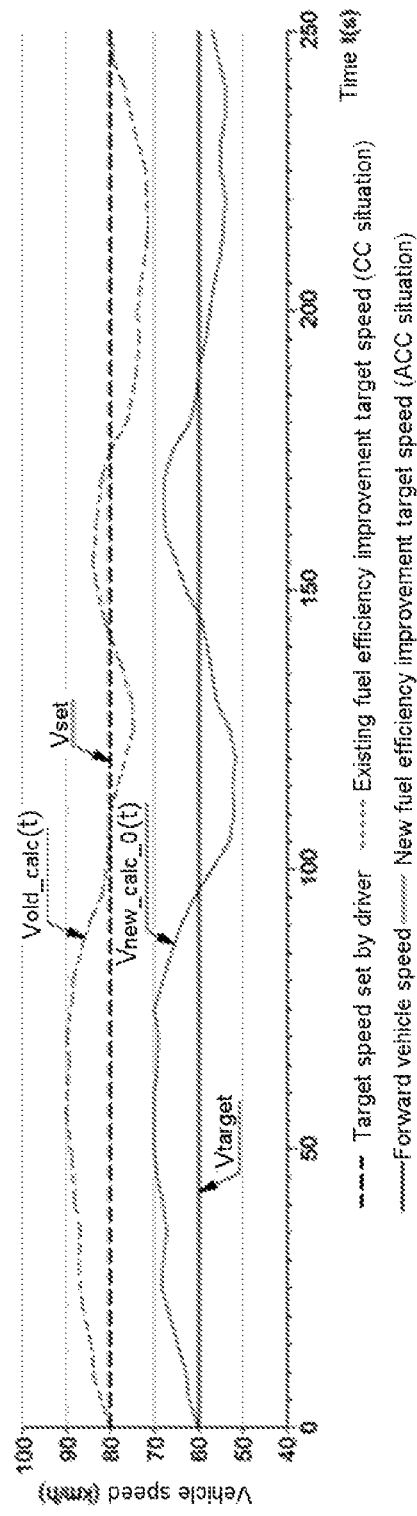

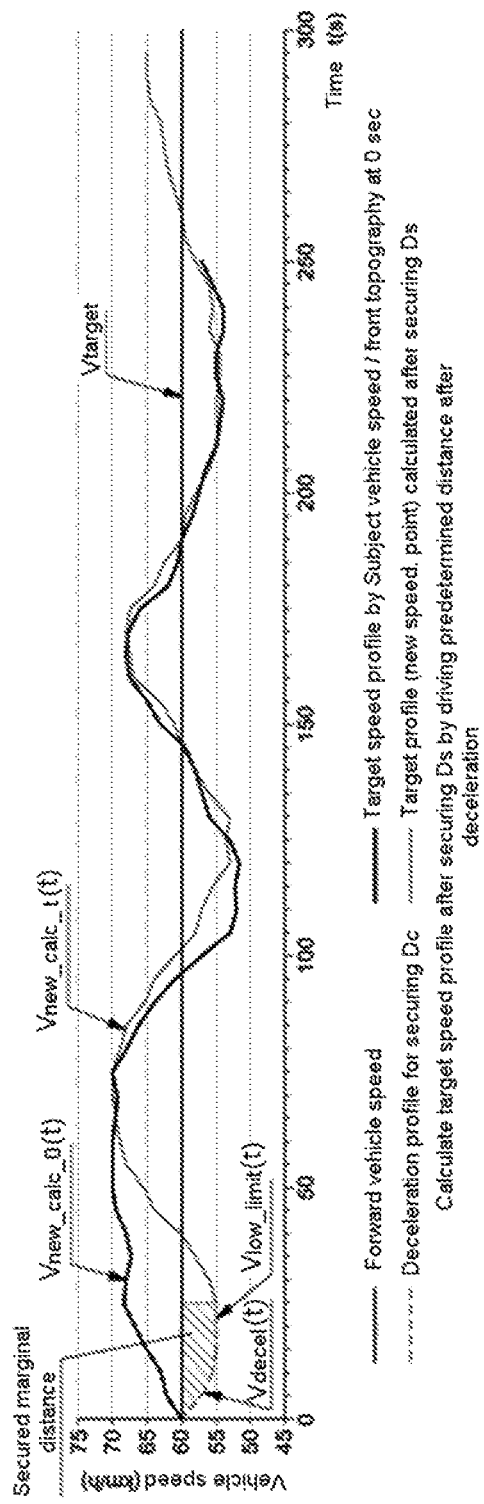
[Fig. 7]

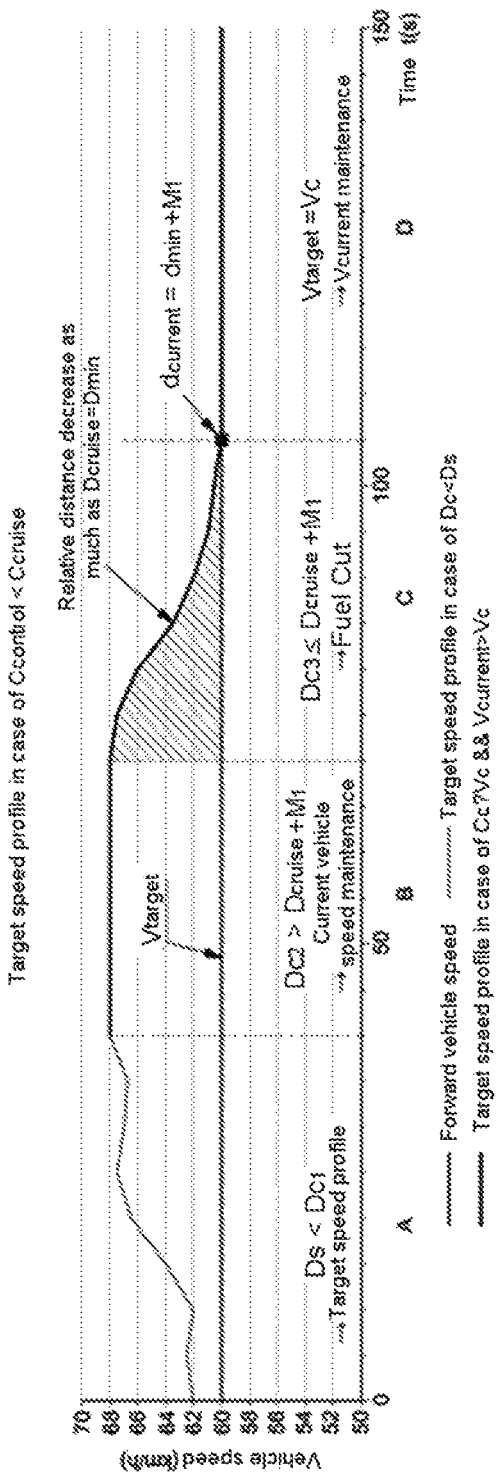
[Fig. 8]

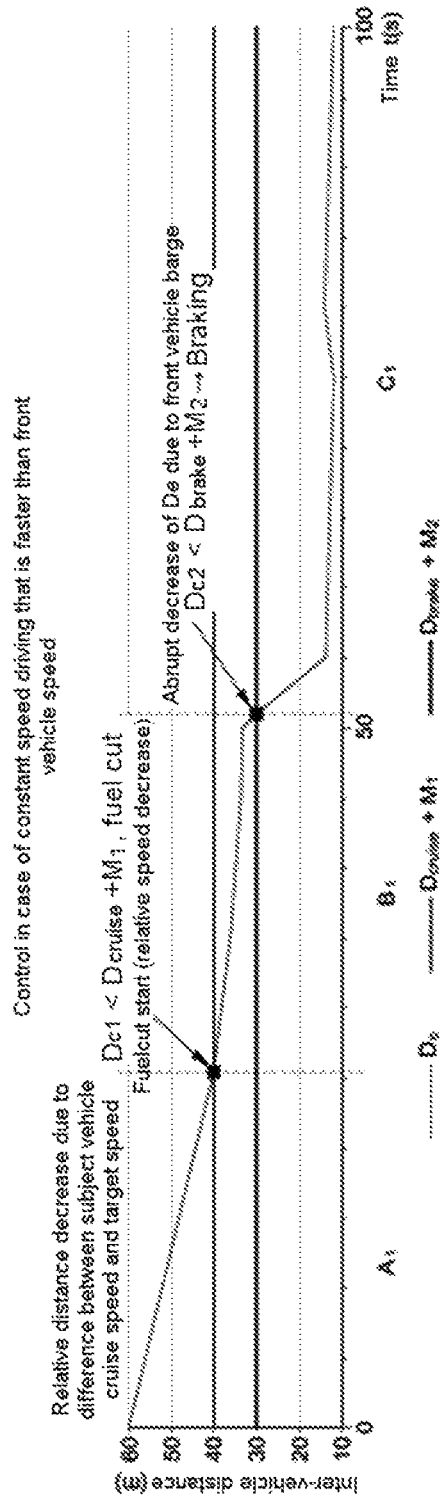
[Fig. 9]

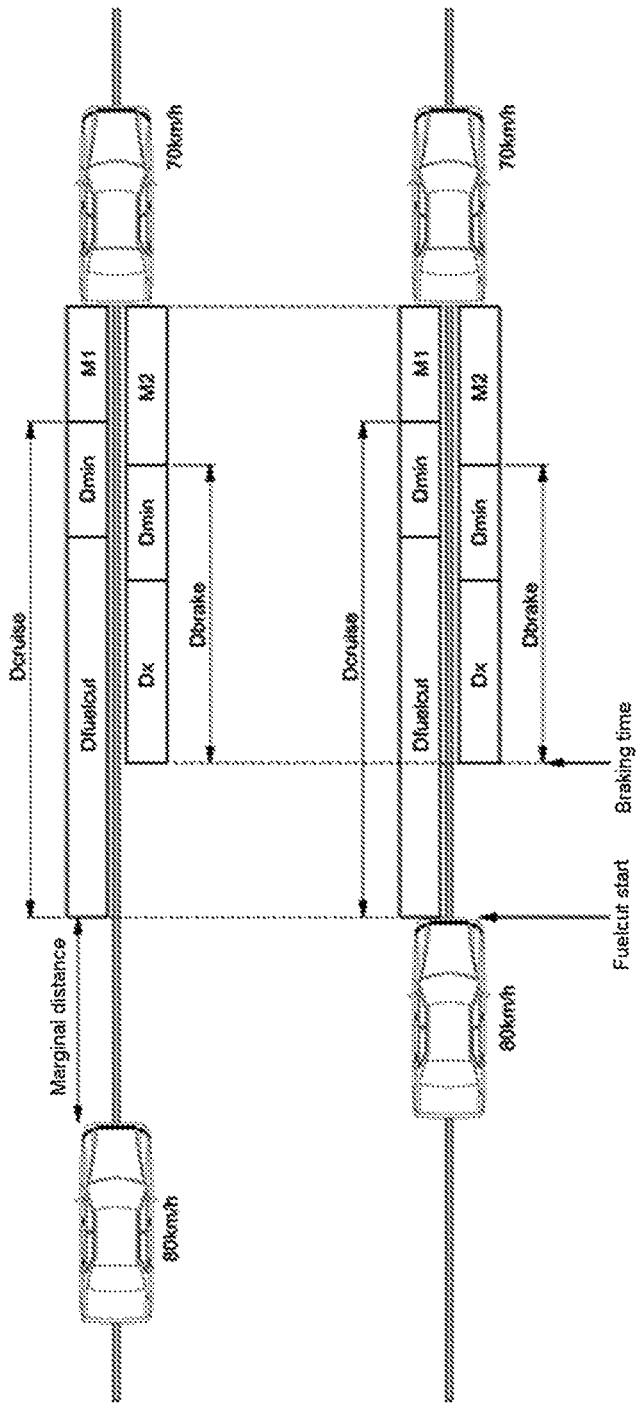
[Fig. 10]

[Fig. 11]
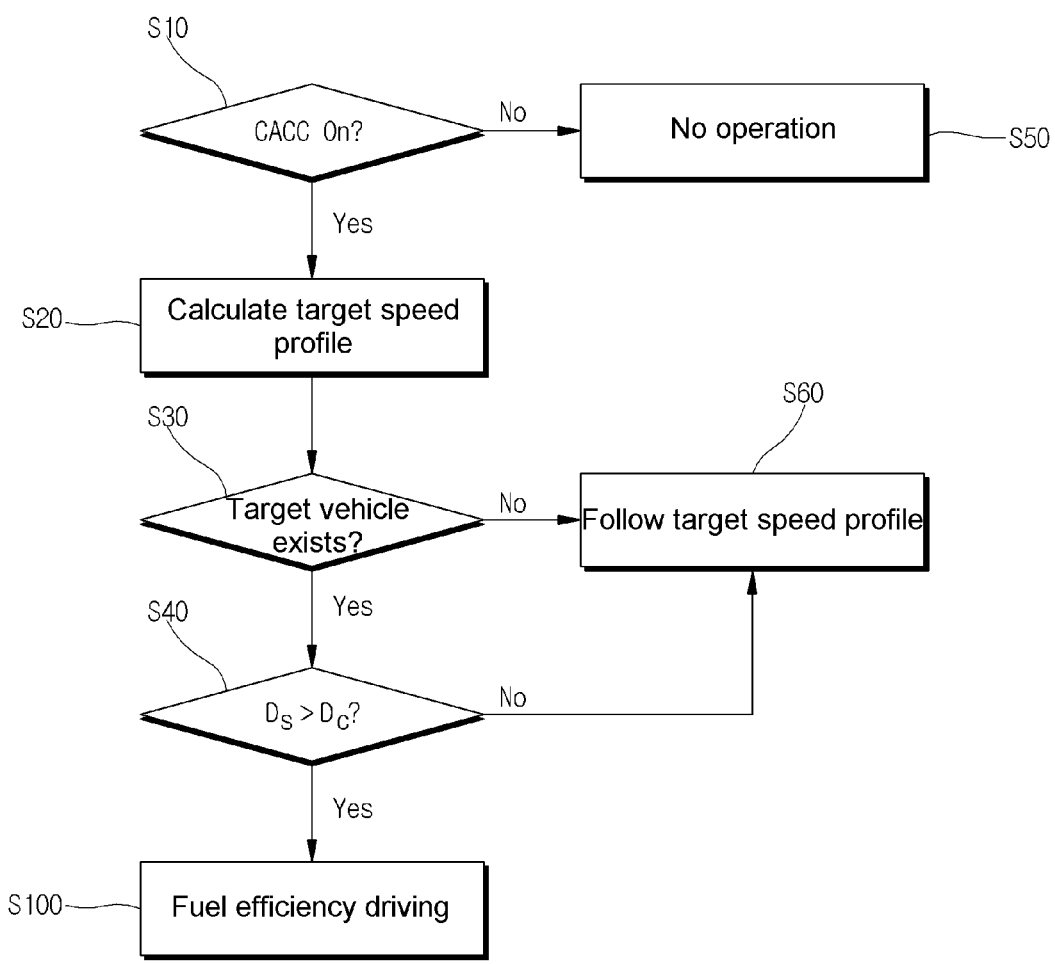

[Fig. 12]
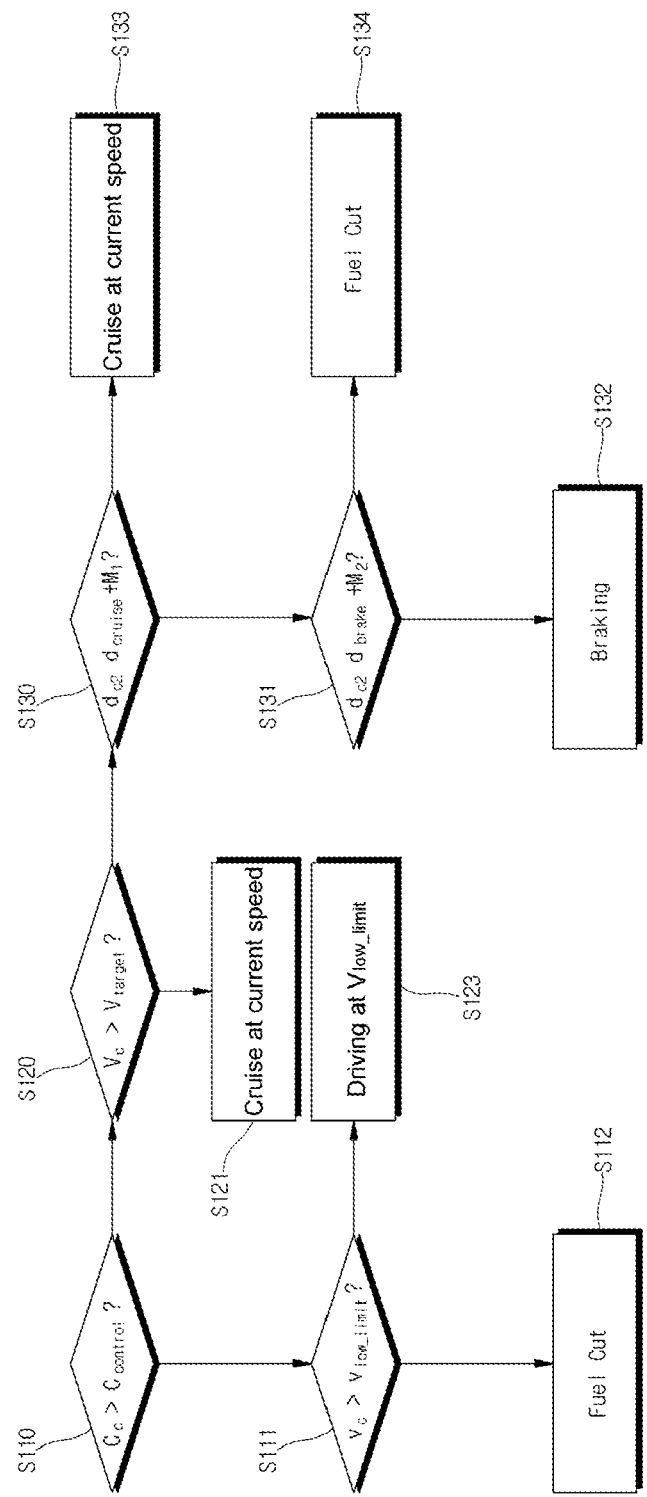

CONTROL APPARATUS AND METHOD FOR IMPROVING FUEL EFFICIENCY IN CACC SYSTEM

BACKGROUND OF THE INVENTION

Field of the Invention

Exemplary embodiments of the present invention relate to a control apparatus and method for improving fuel efficiency in a cooperative adaptive cruise control (CACC) active mode in a CACC system, and more particularly, to a control apparatus and method for improving fuel efficiency in a CACC active mode, which can improve the fuel efficiency through control of a vehicle speed so that a vehicle travels using an optimized cost in consideration of a target vehicle speed, a current speed of the vehicle, the minimum driving speed set in the vehicle, and a deceleration distance if the vehicle that uses the CACC system senses a forwarding vehicle and enters into the CACC active mode.

Description of the Related Art

An adaptive cruise control (hereinafter referred to as "ACC") system is a system which operates to perform automated driving at a speed that is equal to or lower than that set by a driver and to maintain an inter-vehicle distance to a target vehicle that is equal to or larger than a predetermined distance. The ACC system provides a following function for maintaining the vehicle distance enough to prevent collision with a forward target vehicle, which is acquired by distance and/or position measurement sensors mounted on the vehicle, or a cruise function for performing automated driving at the speed set by the user.

The ACC system can enable the driver not to continuously operate an accelerator pedal in order to adjust the driving speed of the vehicle to provide convenience to the driver, and can achieve safety driving by maintaining the predetermined distance to the target vehicle and preventing the vehicle from driving over the set speed.

On the other hand, a CACC system is a system that can improve the ACC function through addition of V2X (Vehicle to Everything) communications to the above-described ACC system. The CACC system may receive the speed limit of a road through V2I (Vehicle to Infrastructure), receive information on a target vehicle that travels in the same lane through V2V (Vehicle to Vehicle), and then improve the ACC performance based on received information.

Recently, in association with a driving path setting system, such as navigation, which is positioned in the vehicle, the CACC system may set and use a target speed profile for improving the fuel efficiency in consideration of road information on the driving path.

In general, the CACC system operates to prevent collision with a target vehicle in a manner that it performs driving with the set target speed profile in the case where no target vehicle exists, and if the target vehicle is found or a forward vehicle is connected thereto, it performs deceleration driving to maintain a predetermined distance to the target vehicle. However, if the target vehicle is found and the vehicle deceleration is performed through braking in order to maintain a predetermined inter-vehicle distance, the driving is performed with a target speed profile that is different from the initially set target speed profile, and the speed of the subject vehicle is adjusted on the basis of the speed of the target vehicle. Accordingly, a stiff control in which acceleration/deceleration control is frequently performed may be performed to lower the fuel efficiency.

SUMMARY OF THE INVENTION

An object of the present invention is to provide a control apparatus and method for improving fuel efficiency in a cooperative adaptive cruise control (CACC) system, which can control a current speed of a subject vehicle if a target vehicle exists, and can set a new target speed profile having an optimized cost based on the current speed that is changed according to the target vehicle in the CACC system that is based on V2X (Vehicle to Everything) communications and a radar.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, a cooperative adaptive cruise control (hereinafter referred to as "CACC") system that is provided in a subject vehicle to control a driving speed of the subject vehicle includes a communication unit configured to receive vehicle information including position and driving information from neighboring vehicles; an information collection unit configured to collect driving information of a forward vehicle and vehicle information of the subject vehicle using sensors provided on the subject vehicle; and a control unit configured to select a target vehicle to be followed by the subject vehicle based on the vehicle information of the neighboring vehicles that is acquired by the communication unit and the driving information of the forward vehicle that is collected by the information collection unit, to control the driving speed of the subject vehicle based on a target speed of the subject vehicle if the target vehicle to be followed by the subject vehicle is not selected, and to control the driving speed of the subject vehicle based on speed information of the target vehicle, speed information of the subject vehicle, and a target time gap if the target vehicle to be followed by the subject vehicle is selected.

The CACC system according to the aspect of the present invention may further include a driving unit configured to control a throttle and a brake, wherein the control unit controls the driving unit to control the driving speed of the subject vehicle. Further, the CACC system according to the aspect of the present invention may further include a driver vehicle interface (DVI) unit configured to receive an input of the target speed and/or the target time gap from a driver and to notify the driver of state information of the CACC system.

The control unit may include a state management unit configured to manage a state of the CACC system; a target vehicle selection unit configured to select the target vehicle to be followed by the subject vehicle based on the vehicle information of the neighboring vehicles that is acquired from the communication unit and the driving information of the forward vehicle that is collected by the information collection unit; a profile management unit configured to set a target speed profile based on the target speed of the subject vehicle and an expected driving path if there is not the target vehicle that is selected by the target vehicle selection unit, and to set a target speed profile based on the speed information of the target vehicle, the speed information of the subject vehicle, and the expected driving path if there is the target vehicle that is selected by the target vehicle selection unit; and a driving management unit configured to control the driving speed of the subject vehicle according to the set target speed profile.

The state management unit may display the state of the CACC system as one of an off state in which the CACC system does not operate, a standby state in which the CACC system operates, but does not control the driving speed of the subject vehicle, an ACC activation state in which the driving speed of the subject vehicle is controlled using only the information that is acquired from the subject vehicle in a state where there is no vehicle in a region of interest that is connected through V2V communications, and a cooperative activation state in which there is the neighboring vehicle in the region of interest that is connected through the V2V communications, and the driving speed of the subject vehicle is controlled using the information from the neighboring vehicle that is acquired through the V2V communications and the information that is acquired from the subject vehicle.

The driving management unit may request the profile management unit to set a new target speed profile if there is a possibility of collision when the driving speed of the subject vehicle is controlled according to the set target speed profile, and the profile management unit may reset the target speed profile based on the speed information of the target vehicle, the speed information of the subject vehicle, and the expected path information according to the request for the new target speed profile setting from the driving management unit.

In accordance with another aspect of the present invention, a control method for improving fuel efficiency in a cooperative adaptive cruise control (hereinafter referred to as "CACC") system that is provided in a subject vehicle to control a driving speed of the subject vehicle includes determining whether to start the CACC system operation; setting a target speed profile based on a target speed of the subject vehicle and an expected driving path; determining whether a target vehicle to be followed by the subject vehicle exists; controlling the driving speed of the subject vehicle according to the set target speed profile if the target vehicle does not exist as the result of the determination; comparing a minimum distance Ds that can prevent collision with the target vehicle even if the subject vehicle is driven according to the target speed profile with a current distance Dc to the target vehicle if the target vehicle exists as the result of the determination; and controlling the driving speed of the subject vehicle according to the target speed profile if the current distance Dc is larger than the minimum distance Ds, and performing a fuel efficiency driving if the current distance Dc is smaller than the minimum distance Ds as the result of the comparison.

Here, the fuel efficiency driving may be performed in consideration of a driving cost Cc in the case of driving to maintain a decelerated current speed after deceleration so that the minimum distance Ds becomes smaller than the current distance Dc, a driving cost Ccontrol in the case of driving according to a new target speed profile that is generated based on the decelerated current speed, a speed of the target vehicle, the speed of the subject vehicle, a minimum driving speed set in the subject vehicle, a distance required to reach the speed Vtarget of the target vehicle through an auxiliary deceleration means, and a distance margin according to a deceleration method.

The performing the fuel efficiency driving may include comparing the driving cost Cc in the case of the current constant-speed driving after the deceleration of the subject vehicle so that the minimum distance Ds becomes smaller than the current distance Dc, with the driving cost Ccontrol in the case of the driving according to the new target speed profile that is generated based on the decelerated current speed; maintaining the constant-speed driving at the current speed of the subject vehicle or performing the deceleration through comparison of the current speed of the subject vehicle with the speed of the target vehicle if the driving cost Cc is smaller than the driving cost Ccontrol as the result of the comparison; and comparing the current speed of the subject vehicle with the minimum speed that is set in the subject vehicle if the driving cost Cc is larger than the driving cost Ccontrol as the result of the comparison, wherein the comparing the current speed of the subject vehicle with the minimum speed that is set in the subject vehicle includes performing decelerated driving through the auxiliary deceleration means if the current speed of the subject vehicle is higher than the minimum speed that is set in the subject vehicle; and performing the driving at the minimum speed that is set in the subject vehicle if the current speed of the subject vehicle is lower than the minimum speed that is set in the subject vehicle.

The maintaining the constant-speed driving at the current speed of the subject vehicle or performing the deceleration through comparison of the current speed of the subject vehicle with the speed of the target vehicle may further include performing the driving at the current speed of the subject vehicle if the current speed of the subject vehicle is lower than the speed of the target vehicle; and comparing a current distance Dc2 between the subject vehicle and the target vehicle with a sum of a distance Dcruise that is required to reach the driving speed of the target vehicle through the auxiliary deceleration means and the distance margin M1 according to the auxiliary deceleration means if the current speed of the subject vehicle is larger than the speed of the target vehicle.

The comparing the current distance Dc2 with the sum of the distance Dcruise and the distance margin M1 may include performing the driving at the current speed of the vehicle if the current distance Dc2 is larger than the sum of the distance Dcruise and the distance margin M1; and comparing the current distance Dc2 with a sum of a distance Dbrake that is required to reach the driving speed of the target vehicle through performing braking by a brake and a distance margin M2 that is required during the braking by the brake if the current distance Dc2 is smaller than the sum of the distance Dcruise and the distance margin M1.

The comparing the current distance Dc2 with the sum of the distance Dbrake and the distance margin M2 may include performing the deceleration through the auxiliary deceleration means of the vehicle if the current distance Dc2 is larger than the sum of the distance Dbrake and the distance margin M2; and performing the deceleration through the braking by the brake if the current distance Dc2 is smaller than the sum of the distance Dbrake and the distance margin M2.

The target speed profile may be set in consideration of road information on a driving path of the vehicle, and the road information may include a road curvature, a grade, and a radius of rotation.

According to the configurations, a combination thereof, and the use relationship between them according to the embodiments of the present invention as described above, the following effects can be achieved.

In performing the CACC system, even in the case where the target vehicle exists, the fuel efficiency can be improved through following of a new target speed profile without collision.

Further, since it is not required to artificially perform continuous deceleration according to the distance to the target vehicle, an additional advantage can be provided on the side of the fuel efficiency.

Further, in the case of securing the distance enough to prevent the collision with the target vehicle, the system is configured to follow a new driving method according to the current speed of the vehicle, and thus the driving cost can be optimized.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which:

FIG. 1 is an exemplary diagram of a CACC system to which the present invention is applied;

FIG. 2 is a diagram illustrating a region of interest (ROI) of a CACC system on a straight road;

FIG. 3 is a block diagram illustrating the configuration of a CACC system according to an embodiment of the present invention;

FIG. 4 is a diagram illustrating state transitions of a CACC system according to an embodiment of the present invention;

FIG. 5 is a diagram illustrating a target speed profile that is generated by a profile management unit 337 according to driver's target speed setting and a driving speed of a target vehicle according to an embodiment of the present invention;

FIG. 6 is a diagram illustrating a new target speed profile that is set by a profile management unit 337 according to a driving speed of a target vehicle;

FIG. 7 is a diagram illustrating an example in which a new target speed profile is set after deceleration is performed to maintain a preset minimum inter-vehicle distance or a minimum time gap according to an embodiment of the present invention;

FIG. 8 is a diagram illustrating an example of a driving speed of a subject vehicle according to an inter-vehicle distance and cost sizes of Cc and Ccontrol according to the present invention;

FIG. 9 is a diagram illustrating a change of an inter-vehicle distance between a subject vehicle and a target vehicle in the case where the subject vehicle performs constant-speed driving at a speed that is higher than a target vehicle driving speed according to an embodiment of the present invention;

FIG. 10 is a diagram illustrating distance relations among Dcruise, Dbrake, and M1 and M2;

FIG. 11 is a flowchart of a control method for improving fuel efficiency of a CACC system using a target speed profile if a target vehicle exists according to an embodiment of the present invention; and FIG. 12 is a flowchart illustrating a control method for performing fuel-efficiency driving according to an embodiment of the present invention.

DESCRIPTION OF SPECIFIC EMBODIMENTS

In order to clearly explain the present invention, portions that are not related to the explanation are omitted, and in the entire description of the present invention, the same reference numerals are used for the same or similar elements across various figures.

In the entire description of the present invention, the term "connected to" or "coupled to" that is used to designate a connection or coupling of one element to another element includes both a case that an element is "directly connected or coupled to" another element and a case that an element is connected or coupled to another element via still another element. The term "includes" and/or "including" used in the description means that one or more other components are not excluded in addition to the described components.

The term "on" that is used to designate that an element is on another element includes both a case where an element is located directly on another element and a case where an element is located on another element via still another element. In contrast, the term "directly on" means that an element is directly on another element without intervention of any other element.

Although the terms "first, second, and so forth" are used to describe diverse elements, components, regions, layers, and/or sections, such elements, components, regions, layers, and/or sections are not limited by the terms. The terms are used only to discriminate an element, component, region, layer, or section from other elements, components, regions, layers, or sections. Accordingly, in the following description, a first element, first component, first region, first layer, or first section may be different from or may be identical to a second element, second component, second region, second layer, or second section within a range that does not deviate from the scope of the present invention.

In the following description of the present invention, the terms used are for explaining embodiments of the present invention, but do not limit the scope of the present invention. In the description, a singular expression may include a plural expression unless specially described. The term "comprises" and/or "comprising" used in the description means that one or more other features, regions, integers, steps, operations, elements, and/or components are not excluded in addition to the described features, regions, integers, steps, operations, elements, and/or existence or addition of components.

Spatially relative wordings "below", "beneath", "lower", "above", "upper", and so forth, as illustrated in the drawings, may be used to facilitate the description of relationships between an element or constituent elements and another element or other constituent elements. The spatially relative wordings should be understood as wordings that include different directions of the element in use or operation in addition to the direction illustrated in the drawings. For example, if an element illustrated in the drawing is stated reversely, the element described to be "below" or "beneath" another element may be put "above" the another element. Accordingly, the exemplary wording "below" may include both directions corresponding to "below" and "above." An element may be rotated by 90° or another angle, and thus the spatially relative wordings may be interpreted accordingly.

Unless specially defined, all terms (including technical and scientific terms) used in the description could be used as meanings commonly understood by those ordinary skilled in the art to which the present invention belongs. In addition, terms that are generally used but are not defined in the dictionary are not interpreted ideally or excessively unless they have been clearly and specially defined.

Hereinafter, preferred embodiments of the present invention will be described in detail with reference to the accompanying drawings. The matters defined in the description, such as the detailed construction and elements, are nothing but specific details provided to assist those of ordinary skill in the art in a comprehensive understanding of the invention. However, the present invention is not limited to the embodiments disclosed hereinafter, but can be implemented in diverse forms.

First, wordings that may be used in the description will be defined.

Forward vehicle: Vehicle that is in front of a subject vehicle and moves in the same direction along the same road of the subject vehicle Clearance: Distance between an end portion of a forward vehicle and a front portion of a subject vehicle Region of interest: Region in which a potential vehicle of interest to be described later and a target vehicle exist, and which may exert an influence on the control of a CACC system that is provided in a subject vehicle Potential vehicle of interest: Vehicle which exists in a region of interest and performs V2V communications with a subject vehicle Target vehicle: Vehicle which is followed by a subject vehicle and which may be connected or may not be connected to a subject vehicle through V2V communications Time gap: Value that is calculated by the speed of a subject vehicle and a gap between a subject vehicle and a forward vehicle (time gap=gap/speed)

Hereinafter, preferred embodiments of the present invention will be described in detail with reference to the accompanying drawings.

FIG. 1 is an exemplary diagram of a CACC system to which the present invention is applied.

As illustrated in FIG. 1, a CACC system 300 that is applied to the present invention is a system to which wireless communications with front vehicles and/or infrastructures are added in order to strengthen the sensing capability of an ACC system in the related art. The CACC system 300 may receive a road speed limit, a time gap (time difference between a subject vehicle and a front vehicle), and/or other standard messages from road-side equipment (RSE) using V2I communications. That is, the CACC system 300 of the vehicle may receive an input of information, such as a recommended set speed or a time gap, from the regional traffic control system through the V2I communications. Further, the CACC system may receive neighboring vehicle information that includes driving information (speed and acceleration) of a neighboring vehicle 20 through the V2V communications with at least one neighboring vehicle 20, or may transfer its own vehicle information to the neighboring vehicle 20. In addition, the CACC system may acquire vehicle information of a vehicle that may be in front of the subject vehicle using sensors in the related art.

In this case, the traveling vehicle information may include vehicle identification (ID) for discriminating from other vehicles, vehicle shape, size, brake performance, vehicle financial resource information including total vehicle weight, vehicle position information indicated by 3D coordinates of latitude, longitude, and altitude, vehicle progressive angle measured on the basis of due north direction, vehicle speed, acceleration, yaw rate, brake state, throttle position, and steering angle.

Further, the CACC system may receive an input of a set speed or a time gap from a driver through a driver vehicle interface (DVI) 60, and may notify the driver of state information of the CACC system. Further, the CACC system may acquire vehicle information 50 from various kinds of sensors or control devices provided inside the vehicle. The CACC system may control the speed of the vehicle through control of the throttle or brake based on various kinds of data collected through the above-described method.

As described above, through the information acquisition by the V2V communications and/or V2I communications, the CACC system can control the time gap with the front vehicle more accurately while maintaining smooth driving comport, and can respond to the speed changes by a plurality of front vehicles quite rapidly. Further, the CACC system has the advantage that it can set a shorter time gap without weakening safety or driver's sense of stability.

FIG. 2 is a diagram illustrating a region of interest (ROI) of a CACC system on a straight road.

The CACC system may take interest in only neighboring vehicles that come into the region of interest (ROI). Information that comes from a vehicle that is out of the ROI may be almost meaningless information in controlling the vehicle. Accordingly, the CACC system may perform a control operation using only information that comes from vehicles that are within the region of interest to reduce a load that is applied to the CACC system.

Referring to FIG. 2, the region of interest may be set to have lengths of 16 m and 32 m in left and right directions, respectively, on the basis of the center of the vehicle in which the CACC system is mounted. Further, the region of interest may be set to have a length of 250 m in the front direction and a length of 100 m in the rear direction around a driver's seat. In the case of a curved road, the region of interest may be set to bend the region of interest that is set on a straight road to match the curvature of the curved road.

Further, the CACC system may set a target vehicle and a potential vehicle of interest (PVOI). The target vehicle means a front vehicle that is followed by the subject vehicle that is mounted with the CACC system. That is, the CACC system uses a distance that is maintained between the subject vehicle and the target vehicle when calculating the time gap, and the target vehicle becomes a target for which the time gap is constantly maintained. The potential vehicle of interest means a vehicle which is within the region of interest and is connected to the CACC system through the V2V communications. The potential vehicle of interest may be a vehicle that can exert an influence on the speed control of the subject vehicle that is mounted with the CACC system. A vehicle which is in a side lane and is expected to join in the lane of the subject vehicle or a vehicle which is in the same lane as the subject vehicle and the target vehicle and is in front of the target vehicle may be the potential vehicle of interest, and the potential vehicle of interest may become the target vehicle.

FIG. 3 is a block diagram illustrating the configuration of a CACC system according to an embodiment of the present invention.

Referring to FIG. 3, a CACC system according to the present invention may include an information collection unit 310, a communication unit 320, a DVI unit 340, and a control unit 330. The control unit 330 may include a state management unit 331, a driving management unit 333, and a target vehicle selection unit 335, and may further include a profile management unit 337.

The communication unit 320 may receive a road speed limit, a time gap (time difference between a subject vehicle and a front vehicle), and/or other standard messages from RSE 10 based on V2I communications. That is, the CACC system 300 of the vehicle may receive not only a recommended set speed or time gap information but also information related to a road, traffic, weather, and life from the regional traffic control system through the V2I communications. Further, the communication unit 320 may receive neighboring vehicle information that includes driving information (speed and acceleration) of a neighboring vehicle 20 through V2V communications with at least one neighboring vehicle 20, or may transfer its own vehicle information to the neighboring vehicle 20. Particularly, in this case, the communication unit may provide not only its own driving information but also identification information or driving information of a forward vehicle to the neighboring vehicle 20. In the case where the neighboring vehicle provides only the identification information, the communication unit may acquire vehicle information of a forward vehicle of the neighboring vehicle that has sent the identification information using information that comes from the neighboring vehicle having the identification information. Accordingly, the subject vehicle can acquire the vehicle information even with respect to the target vehicle and a forward vehicle of the target vehicle. On the other hand, in the case of transmitting only the identification information, the amount of data that is transmitted by the respective vehicles can be reduced.

Further, the information collection unit 310 may collect subject vehicle information that is required to control the CACC system and surrounding environment information that is collected using sensors. The subject vehicle information may include subject vehicle driving speed, throttle, and brake control information, and the surrounding environment information may include information of the neighboring vehicle 20 that is collected through the sensors. In particular, if the target vehicle exists in front of the subject vehicle, the information collection unit may collect the surrounding environment information through calculation of the driving speed of the target vehicle and a gap distance based on radar or lidar.

The DVI unit 340 may receive setting information that is input from a driver through driver-vehicle interface, and may transfer information that is needed to be notified by the driver, such as state information of the CACC system 300 and warning information that may be generated by the CACC system 300, to the driver. As an example, the driver may input a target speed and/or target time gap through the DVI unit 340, and the CACC system 300 may operate the subject vehicle to match the input target speed and/or target time gap. As another example to be described later, the state information on whether the CACC system is in an off state, a standby state, or an activation state may be notified by the driver through the DVI unit 340.

Further, the CACC system may further include a driving unit (not illustrated). The driving unit may control a throttle and/or a brake according to a control signal of the control unit 330 to be described later.

The control unit 330 may control the driving speed of the subject vehicle based on the information that is acquired by the information collection unit 310 and the communication unit 320. That is, the control unit 330 may select a target vehicle to be followed by the subject vehicle based on the vehicle information of the neighboring vehicles that is acquired by the communication unit 320 and the driving information of the forward vehicle that is collected by the information collection unit 310, may control the driving speed of the subject vehicle based on the target speed of the subject vehicle if the target vehicle to be followed by the subject vehicle is not selected, and may control the driving speed of the subject vehicle based on speed information of the target vehicle, speed information of the subject vehicle, and the target time gap if the target vehicle to be followed by the subject vehicle is selected. In this case, a user may set the target speed and the target time gap, or the CACC system may automatically set the target speed and the target time gap to match the situation based on the information that is acquired by the information collection unit 310 and the communication unit 320.

In order to perform the above-described functions, the control unit 330 may include a state management unit 331, a driving management unit 333, a target vehicle selection unit 335, and/or a profile management unit 337.

The target vehicle selection unit 335 may select a potential vehicle of interest and the target vehicle based on the vehicle information of a plurality of neighboring vehicles 20 that comes through the communication unit 320. The potential vehicle of interest means a neighboring vehicle that exists in the region of interest as described above. If the neighboring vehicle is within the region of interest based on position information that is received from the neighboring vehicle and position information of the subject vehicle, the corresponding neighboring vehicle may be selected and registered as the potential vehicle of interest. In addition, the forward vehicle that is just in front of the subject vehicle among the potential vehicles of interest may be selected as the target vehicle. Particularly, in the case of the target vehicle, it is required to verify the target vehicle with very high reliability, and thus the target vehicle may be selected through verification of three kinds of conditions below based on the forward vehicle information that is collected through the information collection unit 310.

1. Using position information of potential vehicles of interest, the potential vehicles of interest (hereinafter referred to as "first group of potential vehicles of interest") that travel in the same lane as the lane of the subject vehicle are selected.

2. Potential vehicles of interest (hereinafter referred to as "second group of potential vehicles of interest"), in which existence range information that is received from each potential vehicle of interest of the first group of potential vehicles of interest exists within one value of (0.1×(the range measured by the sensor)) and (0.7×(the length of each potential vehicle of interest)) that is larger than the other value, are selected. In this case, if the length of the potential vehicle of interest is not known, the value of (0.7×(the length of each potential vehicle of interest)) may be 3.3 m.

3. Potential vehicles of interest (hereinafter referred to as "third group of potential vehicles of interest"), in which a difference between speed information that is received from each potential vehicle of interest of the second group of potential vehicles of interest and the speed that is measured by the sensor is within 1 m/s, are selected.

It is general that only one potential vehicle of interest is included in the third group of potential vehicles of interest that is selected through verification of the three kinds of conditions. However, in the case where two or more potential vehicles of interest are included in the third group of potential vehicles of interest, the potential vehicle of interest that is in the closest position may be selected as the target vehicle based on the position information of each potential vehicle of interest of the third group of potential vehicles of interest.

If the existence/nonexistence of the target vehicle or potential vehicle of interest is determined by the target vehicle selection unit 335, such information may be transferred to the state management unit 331, the driving management unit 333, and/or the profile management unit 337 to be used to match the purposes of the respective functions.

The state management unit 331 may manage the state of the CACC system. The CACC system may be in an off state, a standby state, or an activation state in accordance with the state of the subject vehicle, and existence/nonexistence of the target vehicle and/or potential vehicle of interest.

FIG. 4 is a diagram illustrating state transitions of a CACC system according to an embodiment of the present invention.

Referring to FIG. 4, the CACC system may include an off state 400 in which the CACC system does not operate, a standby state 500 in which the CACC system operates, but does not control the driving speed of the subject vehicle, and an activation state 600 in which the driving speed of the subject vehicle is controlled. In particular, the activation state 600 may include an ACC activation state 610 in which the driving speed of the subject vehicle is controlled using only the information that is acquired from the subject vehicle in a state where there is no vehicle in the region of interest that is connected through the V2V communications, and a cooperative activation state 620 in which there is a neighboring vehicle in the region of interest that is connected through the V2V communications, and the driving speed of the subject vehicle is controlled using the information from the neighboring vehicle that is acquired through the V2V communications and the information that is acquired from the subject vehicle.

The off state 400 is a state in which the CACC system does not operate. That is, in the off state 400, the CACC system performs no function. The CACC system may be transitioned to the off state 400 through stalling of the subject vehicle or driver's manual operation.

The standby state 500 is a state in which the CACC system stands to be activated, and in the standby state 500, the CACC system does not perform the speed control. If the subject vehicle starts up, the CACC system may be transitioned to the standby state 500 after automatic completion of self-diagnosis in the off state 400, or may be transitioned from the off state 400 to the standby state 500 by the driver's manual operation. Further, the CACC system may be transitioned to the standby state 500 if a driver's manual control input, such as brake or throttle control, is received in the activation state 600.

The activation state 600 is a state in which the CACC system is activated to perform the speed control. As described above, the activation state 600 may include the ACC activation state 610 and the cooperative activation state 620. If there is not a potential vehicle of interest or a target vehicle that is connected through the V2V communications, the CACC system operates in the ACC activation state 610, whereas if there is a potential vehicle of interest or a target vehicle that is connected through the V2V communications, the CACC system operates in the cooperative activation state 620. The CACC system may be transitioned to the activation state 600 if the speed of the subject vehicle becomes higher than a predetermined speed (hereinafter referred to as a "first speed") in the standby state 500. Further, if the speed of the subject vehicle is lowered below the first speed in the activation state 600, the CACC system may forbid acceleration or may be transitioned to the standby state 500.

When the CACC system is transitioned to the activation state 600, it may first operate in the ACC activation state 610. In the ACC activation state 610, cruise control may be performed to match the highest speed that is set like the ACC system in the related art, or following control may be performed if a front vehicle exists. In the ACC activation state 610, if a potential vehicle of interest or a target vehicle that is connected through the V2V communications exists and data that is received from the potential vehicle of interest or the target vehicle is reasonable, the CACC system may be transitioned to the cooperative activation state 620. In an embodiment of the present invention, if information related to the potential vehicle of interest or the target vehicle that is received using the V2V communications coincides with the vehicle information that is acquired by the sensor of the subject vehicle through the information collection unit 310, it may be verified that the data is reasonable. Such verification may be performed by the target vehicle selection unit 335.

Further, if the potential vehicle of interest or the target vehicle does not exist in the cooperative activation state 620, the CACC system may be transitioned to the ACC activation state 610, and even if the V2V communications are not performed or only unreasonable data is received, the CACC system may be transitioned to the ACC activation state 610.

The cooperative activation state 620 of the CACC system may include a non-follow mode 621, a close-follow mode 622, and a follow mode 623. The non-follow mode 621 is a mode that is performed in the case where the potential vehicle of interest is connected through the V2V communications, but the target vehicle does not exist, and the speed control of the subject vehicle through the CACC system may be affected by data that is received from the potential vehicle of interest.

The close-follow mode 622 is a mode that is performed in the case where the target vehicle that is connected through the V2V communications exists, and in this case, the speed control of the subject vehicle through the CACC system may be affected by information that comes from the connected target vehicle and potential vehicle of interest.

The follow mode 623 is a mode that is performed in the case where the target vehicle exists, but is not connected through the V2V communications. In this case, the target vehicle may be sensed by the sensor of the subject vehicle, and such information may be acquired by the information collection unit 310. In this case, the speed control of the subject vehicle through the CACC system may be affected by information that comes from the connected potential vehicle of interest and the target vehicle that is sensed by the sensor.

The CACC system may operate in one of the above-described three kinds of modes in the cooperative activation state 620, and the three kinds of modes may be determined depending on whether the target vehicle exists and whether the target vehicle is connected through the V2V communications.

That is, referring to FIG. 4, if the target vehicle does not exist in the region of interest, but the potential vehicle of interest exists in the cooperative activation state 620, the CACC system may be transitioned (A) to the non-follow mode 621, and if the target vehicle that is connected through the V2V communications exists, the CACC system may be transitioned (B) to the close-follow mode. If the target vehicle that is not connected through the V2V communications exists in the region of interest and the potential vehicle of interest also exists in the region of interest, the CACC system may be transitioned (C) to the follow mode 623.

If neither the connected target vehicle nor the potential vehicle of interest exists, the CACC system may be transitioned to the ACC activation state 610.

Maximum and minimum requirements per mode that can be controlled in the activation state 600 of the CACC system may be defined as in Table 1 below.

TABLE 1

| Target vehicle existence | Target vehicle connection | PVOI existence | CACC mode | Minimum time gap | Maximum Deceleration | Maximum Acceleration | Whether to use data received through V2V communications |
|---|---|---|---|---|---|---|---|
| no | no | no | ACC activation state: Speed control mode | 0.8 s | 3.5 m/s$^2$ | 2.0 m/s$^2$ | Unused |
| yes | no | no | ACC activation state: Follow mode | 0.8 s | 3.5 m/s$^2$ | 2.0 m/s$^2$ | Unused |
| no | no | yes | Cooperative activation state: Non-follow mode | 0.8 s | 3.5 m/s$^2$ | 2.0 m/s$^2$ | Used |
| yes | yes | no | Cooperative activation state: Close-follow mode | 0.5 s | 5 m/s$^2$ | 2.75 m/s$^2$ | Used |
| yes | yes | yes | Cooperative activation state: Close-follow mode | 0.5 s | 5 m/s$^2$ | 2.75 m/s$^2$ | Used |
| yes | no | yes | Cooperative activation state: Follow mode | 0.8 s | 3.5 m/s$^2$ | 2.0 m/s$^2$ | Used |

Referring to Table 1, the CACC system is unable to set the minimum time gap to 0.5 s or less, is unable to perform deceleration control of 5 m/s$^2$ or more through control of maximum brake, and is unable to perform acceleration control of 2.75 m/s$^2$ or more through control of throttle.

Referring again to FIG. 3, the state management unit 331 may manage the state of the CACC system 300 according to the above-described method, and if the CACC system 300 is in an activation state, the driving management unit 333 may control the driving speed of the subject vehicle. In the case of the CACC system 300, the driving speed is generally controlled so that the driver can perform driving to match the set target speed. However, if the target vehicle exists, the driving speed may be controlled so that the subject vehicle can follow the target vehicle.

According to the present invention, the driver may set a target speed profile that can maximize the fuel efficiency based on the set target speed, and the driving management unit 333 may manage the driving speed of the subject vehicle according to the set target speed profile. That is, the driving management unit 333 may control the driving speed of the subject vehicle through control of an auxiliary deceleration means that includes a throttle, brake, and fuelcut.

In this case, the used target speed profile may be set by the profile management unit 337. However, if the target vehicle exists in front and the follow control is performed, it may not be possible to perform driving according to the set target speed profile, and in this case, it is required to generate a new target speed profile for maximizing the fuel efficiency.

FIG. 5 is a diagram illustrating a target speed profile that is generated by a profile management unit 337 according to driver's target speed setting and a driving speed of a target vehicle according to an embodiment of the present invention.

Referring to FIG. 5, if the driver sets a target speed Vset, the profile management unit 337 may calculate a target speed profile $V_{old\_calc}(t)$ for improving or maximizing fuel efficiency through synthesis of road information that can be acquired with respect to a path to travel in the future based on the set target speed Vset. The profile management unit 337 may collect map information and navigation which are stored in the subject vehicle based on path information that is input by the driver or is automatically calculated, and road information, such as a curvature, a grade, and a radius of rotation of a specific road on a path related to the path from a regional traffic control system using V2I communications and/or from a front vehicle using V2V communications, and may set the target speed profile using the collected road information. The target speed profile may be automatically generated whenever the driver sets the target speed or changes the path regardless of the current state of the CACC system.

The target speed profile that is generated by the profile management unit 330 may be transferred to the driving management unit 333, and the driving management unit 333 may control the driving speed of the subject vehicle to match the target speed profile.

However, if a target vehicle that travels at a constant speed exists in front although the target speed profile is set and the subject vehicle travels accordingly, the driving management unit 333 may perform the control that disregards the target speed profile in order to match a gap distance or a time gap for preset safety. In this case, if the subject vehicle travels according to the target speed profile in a state where the speed of the target vehicle is lower than the speed according to the target speed profile as shown as an example of FIG. 5, collision between the subject vehicle and the target vehicle will occur after some time.

That is, if the current time is t0, collision may occur in the minimum time t1 in which the following is materialized.

$$D(t0) \leq \int_{t0}^{t1} (V_{old\_calc}(t) - V_{target}) dt$$

Here, D(t0) denotes a distance between the subject vehicle and the target vehicle at t0, $V_{old\_calc}(t)$ denotes the driving speed of the subject vehicle at time t through the target speed profile, and $V_{target}$ denotes the driving speed of the target vehicle.

In order to prevent such collision, the driving management unit 333 may perform the follow control regardless of the target speed profile, but in order to maximize the fuel efficiency, it is required to set a new target speed profile and to perform driving accordingly. Thus, the driving management unit 333 may request the profile management unit 337 to set a new target speed profile according to the existence of the target vehicle, and the profile management unit 337 may set the new target speed profile to match such a request.

As an example of setting a new target speed profile, the profile management unit 337 may set the new target speed profile to match the speed of the target vehicle.

FIG. 6 is a diagram illustrating a new target speed profile that is set by a profile management unit 337 according to a driving speed of a target vehicle.

Referring to FIG. 6, the profile management unit 337 may set a new target speed profile $V_{new\_calc\_0}(t)$ based on the driving speed of the target vehicle. The newly set target speed profile may be transferred to the driving management unit 333 to control the driving speed of the subject vehicle. That is, if the target vehicle exists, the profile management unit 337 may set a new target speed profile that has the same speed change as the speed change of the target speed profile in the related art in order to improve or maximize the fuel efficiency based on the driving speed of the target vehicle instead of the target speed set by the driver. Referring to an example of FIG. 6, if the target speed set by the driver is 80 km/h and the driving speed of the target vehicle is 60 km/h, the profile management unit 337 may set a new fuel efficiency improvement target speed profile to $V_{new\_calc\_0} = V_{old\_calc}(t) - 20$. The newly set target speed profile may be transferred to the driving management unit 333, and the driving management unit 333 may manage the driving according to the newly set target speed profile.

However, in the case of setting the new fuel efficiency improvement target speed profile in this method, it is required to determine whether the preset minimum gap distance or minimum time gap can be maintained. If not, it is required for the driving management unit 333 to perform the speed change that includes an artificial deceleration section.

More specifically, in order to prevent collision between the subject vehicle and the target vehicle when the subject vehicle travels with the new target speed profile, the distance between the subject vehicle and the target vehicle should satisfy a preset allowable minimum distance Dmin or a preset allowable time gap min. Here, the allowable minimum distance Dmin may be Dmin=τmin×E(V). Here, E(V) may be an average of the driving speed of the subject vehicle during the time gap min. In this case, if the current distance between the subject vehicle and the target vehicle is equal to or larger than Ds that is calculated through an equation below, the minimum distance between the subject vehicle and the target vehicle becomes larger than Dmin when the subject vehicle travels with the new target speed profile to prevent the collision. That is, Ds may mean the minimum distance for preventing collision between the target vehicle and the subject vehicle during following of the new target speed profile, and may be calculated through the equation below.

$$Ds = Dmin + |min(\Delta d)|$$

Here, min(A) means the minimum value of A, and |B| means an absolute value of B. Further, Δd is a relative distance variation between the subject vehicle and the target vehicle, and may be calculated by integrating a difference between the target vehicle driving speed $V_{target}$ and the newly set target speed profile $V_{new\_calc\_0}(t)$ as in the following equation.

$$\Delta d = \int (V_{target} - V_{new\_calc\_0}(t)) dt$$

Referring to the above equation, min(Δd) may be the maximum distance that is narrowed by the speed difference between the subject vehicle and the target vehicle.

Accordingly, if the current inter-vehicle distance between the target vehicle and the subject vehicle is smaller than Ds, there is a possibility of collision when the driving is performed with the newly set target speed profile, and thus a speed change that includes an artificial deceleration section for securing Ds may be additionally required.

FIG. 7 is a diagram illustrating an example in which a new target speed profile is set after deceleration is performed to maintain a preset minimum inter-vehicle distance or a minimum time gap according to an embodiment of the present invention.

Referring to FIG. 7, in the case where the driving is performed to follow $V_{new\_calc\_0}(t)$ that is set by the profile management unit 337 as the new target speed profile, it is determined that the preset minimum inter-vehicle distance or the minimum time gap cannot be maintained, and thus it is required to perform an additional deceleration.

The additional deceleration may be performed by a main brake (frictional brake) or an auxiliary deceleration means. Here, the auxiliary deceleration may mean a certain means that can decelerate the vehicle in addition to the main brake (frictional brake), and may include all means, such as fuelcut, engine brake, auxiliary brake (retarder or exhaust brake), and eco-roll (neutral gear state), that can decelerate the vehicle with improved fuel efficiency in comparison to a case where the main brake is used.

Depending on the deceleration methods, methods for calculating the speed $V_{decel}(t)$ of a deceleration section that is set by the driving management unit 333 may differ from each other. In an embodiment of the present invention, when the deceleration is performed using an auxiliary deceleration means, such as fuelcut, the speed $V_{decel}(t)$ according to respective time may be calculated as follows.

$$V_{decel}(t) = \int a_{Fuelcut} dt + V_{current}$$

Here, $a_{Fuelcut}$ means a vehicle acceleration (deceleration having a negative (−) value) in the case where the auxiliary deceleration means is performed, and $V_{current}$ denotes the current speed of the subject vehicle.

However, if the calculated $V_{decel}(t)$ is lower than the minimum speed $V_{low\_limit}$ that is preset in the CACC system, $V_{decel}(t)$ may be set as the minimum speed. Here, as the minimum speed, a value that is equal to or larger than the first speed that can change the state of the CACC system from the activation state 600 to the standby state 500 may be used.

If the artificial deceleration is performed as described above, a marginal distance from the target vehicle can be secured (710) as illustrated in FIG. 7 during the deceleration. After securing the marginal distance, the driving management unit 333 may request the profile management unit 337 to generate a new target speed profile, and the profile management unit 337 may generate a new target speed profile $V_{new\_calc\_t}(t)$ according to the request. The driving management unit 333 may calculate the driving cost during the driving as maintaining the driving cost during the driving and the current speed according to the new target speed profile, and may control the driving speed of the subject vehicle using the driving method having a low driving cost. Here, the driving cost may mean the cost that is calculated in consideration of all economical consumption factors including a fuel consumption amount, which is required for the vehicle driving.

In an embodiment, the driving management unit 333 may calculate a driving cost Cc in the case of driving to maintain the current speed and a driving cost Ccontrol in the case of driving according to a new target speed profile $V_{new\_calc\_t}(t)$, and may compare the calculated driving costs with each other. If Ccontrol is smaller than Cc, the driving management unit may additionally compare the minimum speed $V_{low\_limit}$ that is preset in the CACC system 300 with the current driving speed Vc of the subject vehicle, and if the current driving speed Vc is higher than the minimum speed $V_{low\_limit}$, the driving management unit may secure a distance that is equal to or longer than Ds through performing of deceleration through the auxiliary deceleration means. If the current driving speed Vc is lower than the minimum speed $V_{low\_limit}$, the traveling management unit 333 may maintain the driving according to the minimum speed $V_{low\_limit}$.

Unlike this, if Cc is smaller than Ccontrol, the driving management unit may compare the current speed of the vehicle with the driving speed $V_{target}$ of the target vehicle, and may set the driving speed of the vehicle in consideration of the driving speed of the target vehicle, the current driving speed of the subject vehicle, the minimum speed that is preset in the subject vehicle, a distance Demise that is required until reaching the driving speed $V_{target}$ of the target vehicle through the auxiliary deceleration means, a distance Dbrake that is required until reaching the driving speed $V_{target}$ of the target vehicle through braking by a brake, and distance margins M1 and M2 according to the deceleration method.

More preferably, if the current speed of the vehicle is lower than the speed of the target vehicle, the driving management unit may set to maintain the current speed, whereas if the current speed of the vehicle is higher than the speed of the target vehicle, the driving management unit may compare the current distance from the target vehicle with a value that is obtained by summing the distance that is required to reach the driving speed $V_{target}$ of the target vehicle through speed reduction of the subject vehicle through the auxiliary deceleration means and the distance margin M1 according to the deceleration method.

Further, if the value that is obtained by summing the distance that is required to reach the driving speed $V_{target}$ of the target vehicle through speed reduction of the subject vehicle through the auxiliary deceleration means and the distance margin M1 according to the deceleration method is larger than the current distance from the target vehicle, the driving management unit may compare the current distance from the target vehicle with a value that is obtained by summing the distance Dbrake that is required to reach the driving speed $V_{target}$ of the target vehicle through braking by the brake and the distance margin M2 according to the deceleration method. Here, the distance Dbrake may include the minimum gap distance Dmin that is set in the CACC system. That is, the distance Dbrake may be defined by a sum of the distance Dx that is required to reach the driving speed $V_{target}$ of the target vehicle through braking by the brake and the minimum gap distance Dmin. The distance Dx has a value that is always smaller than the distance that is required to reach the driving speed $V_{target}$ of the target vehicle through the deceleration by the auxiliary deceleration means, and in this case, the braking range may be within the braking range that is allowable in the CACC system.

FIG. 8 is a diagram illustrating an example of a driving speed of a subject vehicle according to an inter-vehicle distance and cost sizes of Cc and Ccontrol according to the present invention.

Referring to FIG. 8, section A corresponds to a case where the current inter-vehicle distance Dc1 is larger than Dx. In this case, since a safe inter-vehicle distance is secured, collision with the target vehicle does not occur even if the current target speed profile is followed, the driving according to the set target speed profile may be performed.

In contrast, section B corresponds to a case where the current inter-vehicle distance Dc2 is smaller than Dx, but is larger than the sum of the distance Dcruise that is required to reach the driving speed $V_{target}$ of the target vehicle through the auxiliary deceleration means and the distance margin when using the auxiliary deceleration means, and the driving to maintain the current vehicle speed is performed.

Here, M1 is a certain value that is set by the user according to a distance measurement error between the subject vehicle and the target vehicle and a speed control error of the CACC system, and may be set to a value that is equal to or larger than 0. More preferably, M1 may include a certain value that is set by a vehicle manufacturer during shipment.

Dcruise may mean a distance that is required to reach the driving speed $V_{target}$ of the target vehicle through deceleration by the auxiliary deceleration means, and may be calculated by the following equation.

$$D_{cruise} = \int_0^t V_{decel}(\tau) d\tau + D\min$$

Section C corresponds to a case where the current inter-vehicle distance Dc3 is smaller than the sum of the distance Dcruise that is required until reaching the driving speed $V_{target}$ of the target vehicle through deceleration by the auxiliary deceleration means and the distance margin M1 according to the auxiliary deceleration means, and discloses the configuration of performing the deceleration by the auxiliary deceleration means. Thereafter, in section D, the driving speed of the subject vehicle may be equal to the driving speed $V_{target}$ of the target vehicle in order to maintain the current inter-vehicle distance.

As disclosed above, Dc1, Dc2, and Dc3 are certain numbers that are given to express the current inter-vehicle distance at different determination time points, and continuous distance determination may be performed at the respective time points.

FIG. 9 is a diagram illustrating a change of an inter-vehicle distance between a subject vehicle and a target vehicle in the case where the subject vehicle performs constant-speed driving at a speed that is higher than a target vehicle driving speed according to an embodiment of the present invention.

Referring to FIG. 9, section A1 is a section in which the subject vehicle maintains the current driving speed during driving. In section A1, the subject vehicle constantly travels at the current driving speed, and thus the inter-vehicle distance from the target vehicle is decreased. Section B1 corresponds to a case where the current inter-vehicle distance Dc1 is smaller than the sum of Dcruise and M1 and is larger than the sum of Dbrake and M2. In section B1, the relative speed becomes lowered through deceleration using the auxiliary deceleration means, and thus the slope in which the inter-vehicle distance is decreased becomes lowered in comparison to section A1.

Here, M2 is a value that is set in consideration of the deceleration speed that can provide comfortable braking force to the driver when braking is performed, and may be optionally set by the user or during the vehicle shipment in consideration of the vehicle speed error and the braking force that is set in the CACC system.

More preferably, M2 may be set in consideration of the deceleration speed value that enables the driver to feel smooth braking, and the deceleration speed of the smooth braking may be set within a range that is lower than the maximum deceleration speed that is set in the CACC system.

The distance margin M2 according to the braking may have a value that is smaller than the value of the distance margin M1 according to the auxiliary deceleration means, and may have a negative value.

Further, the value Dbrake+M2 should be set to be always smaller than the value Dcruise+M1, and the sum of the deceleration distance according to the braking and the distance margin M2 should be smaller than the sum of the deceleration distance through the auxiliary deceleration means and the distance margin M1.

Section C1 may be a section in which an abrupt braking is required, and may occur according to barge-in of the potential vehicle of interest or speed deceleration of the target vehicle. In section C1, the current inter-vehicle distance Dc2 becomes smaller than the sum of Dbrake and the distance margin M2 according to the braking, and in this case, braking of the subject vehicle may be performed using a brake.

In the graph as illustrated in FIG. 9, the sections B1 and C1 are configured to control the driving of the subject vehicle through comparison of the current inter-vehicle distance during determination with the sum of the inter-vehicle distance and the distance that is required until reaching the driving speed $V_{target}$ of the target vehicle through the auxiliary deceleration means on condition of the subject vehicle that travels at a normal speed that is higher than the speed of the target vehicle.

FIG. 10 is a diagram illustrating distance relations among Dcruise, Dbrake, M1 and M2.

Referring to FIG. 10, in an embodiment of the present invention, distance Dcruise that is obtained by summing the distance Dfuelcut in which the auxiliary deceleration means (fuel cut in an example of FIG. 10) performs deceleration and the minimum distance Dmin that is set in the CACC system is disclosed. FIG. 10 illustrates a start time for performing the fuelcut as the auxiliary deceleration means, and further illustrates a time for performing braking within the range of Dbrake, which includes the distance Dx that is required to perform deceleration up to the driving speed $V_{target}$ of the target vehicle according to the braking force, and the deceleration speed that is set in the CACC system.

M1 is a distance margin in the case of performing the deceleration through the auxiliary deceleration means, and may be set by the user in consideration of the speed error and the distance measurement error for the target vehicle. M2 is a distance margin in the process of performing the braking, and may correspond to the measurement and setting errors.

As illustrated in FIG. 10, Dfuelcut has a value that is physically larger than the values of Dx and Dmin, and Dcruise also has a value that is larger than the value of Dbrake.

FIG. 11 is a flowchart of a control method for improving fuel efficiency of a CACC system using a target speed profile if a target vehicle exists according to an embodiment of the present invention.

In the case of the CACC system according to the present invention, it is determined whether to start the operation of the CACC system (S10). If the CACC system does not operate, speed control is not performed (S50), whereas if the CACC system operates, a target speed profile may be set (S20) on the basis of a target speed of the subject vehicle and an expected driving path. As an example, in the case where the CACC system is transitioned from an off state 400 to a standby state 500, the target speed profile may be set. The target speed profile may be set on the basis of the target speed that is set by the user in consideration of a road grade, curvature, and inclination that are stored in the control unit based on path information that is set by the user.

As described above, after the target speed profile is set, whether a target vehicle exists is determined (S30). If the target vehicle does not exist, the driving of the subject vehicle is controlled according to the set target speed profile (S60). If the target vehicle exists, a process (S40) of comparing the current inter-vehicle distance Dc between the target vehicle and the subject vehicle with the minimum distance Ds that can prevent collision with the target vehicle even if the subject vehicle travels according to the target speed profile may be performed.

If Dc is larger than Ds as the result of the comparison, the driving is controlled according to the target speed profile that is set at S20 (S60), whereas if Dc is smaller than Ds, fuel efficiency driving may be performed (S100).

The fuel efficiency driving may be performed in consideration of a driving cost Cc in the case of driving to maintain a decelerated current speed after deceleration so that Ds becomes smaller than Dc, a driving cost Ccontrol in the case of driving according to a new target speed profile that is generated based on the decelerated current speed, the target vehicle speed, the current speed of the subject vehicle, the minimum driving speed set in the subject vehicle, a distance required to reach the speed Vtarget of the target vehicle through an auxiliary deceleration means without releasing the CACC system, and a distance margin according to a deceleration method.

FIG. 12 is a flowchart illustrating a control method for performing fuel-efficiency driving according to an embodiment of the present invention.

In order to perform the fuel efficiency driving, the CACC system compares the driving cost Cc in the case of a constant-speed driving to maintain the current speed after deceleration of the subject vehicle so that Ds becomes smaller than Dc with the driving cost Ccontrol in the case of driving according to the new target speed profile that is generated based on the decelerated current speed (S110).

In this case, if Cc is larger than Ccontrol, the CACC system compares the current speed of the subject vehicle with the minimum speed Vlow_limit that is set in the CACC system (S111).

If the current speed of the subject vehicle is higher than the minimum speed, the CACC system operates to decelerate the subject vehicle through an auxiliary deceleration means (S112), whereas if the current speed of the subject vehicle is lower than the minimum speed, the CACC system operates to drive the subject vehicle at the minimum speed (S123).

Unlike this, if Cc is smaller than Ccontrol, the CACC system compares the current speed of the subject vehicle with the speed of the target vehicle (S120). If the current speed of the subject vehicle is lower than the speed of the target vehicle, the CACC system drives the subject vehicle through maintaining of the current speed (S121), whereas if the current speed of the subject vehicle is higher than the speed of the target vehicle, the CACC system compares a current distance Dc2 between the subject vehicle and the target vehicle with the sum of a distance Dcruise that is required until reaching the driving speed $V_{target}$ of the target vehicle through the auxiliary deceleration means and a distance margin M1 that is required for the auxiliary deceleration means (S130). If the current distance Dc2 between the subject vehicle and the target vehicle is larger than the sum of Dcruise and the distance margin M1 that determines the time for the auxiliary deceleration means, the CACC system is set to maintain the current speed (S133), whereas if the distance Dc2 between the subject vehicle and the target vehicle is smaller than the sum of Dcruise and M1, the CACC system compares the distance Dc2 between the subject vehicle and the target vehicle with the sum of a distance Dbrake that is required until reaching the driving speed of the target vehicle through braking by a brake and a distance margin M2 that is required during the braking (S131).

If the current distance Dc2 between the subject vehicle and the target vehicle is smaller than the sum of Dbrake and the distance margin M2, the CACC system performs braking by the brake (S132), whereas if the current distance Dc2 between the subject vehicle and the target vehicle is larger than the sum of Dbrake and the distance margin M2, the CACC system performs deceleration through the auxiliary deceleration means.

As described above, according to the present invention, the vehicle is controlled to follow the optimum fuel efficiency driving profile or speed through application of the above-described logic every moment, and thus it is possible to control the vehicle for fuel efficiency improvement in heavy traffic conditions.

On the other hand, it should be understood that the CACC is exemplified in the specification for convenience in explanation. The CACC is merely one of various ADAS functions, and the CACC implementation that is proposed according to the present invention may also be used to implement other related ADAS functions. For example, the proposed method according to the present invention may be used even to implement one or a combination of ADAS functions, such as CACC, ACC (Adaptive Cruise Control), LCDAS (Lane Change Decision Aid System), LDWS (Lane Departure Warning System), LKAS (Lane Keeping Assistance System), RBDPS (Road Boundary Departure Prevention System), PDCMS (Pedestrian Detection and Collision Mitigation System), CSWS (Curve Speed Warning System), FVCWS (Forward Vehicle Collision Warning System), and LSF (Low Speed Following).

In one or more exemplary embodiments, explained functions may be implemented by hardware, software, firmware, or a certain combination thereof. In the case of implementation by software, these functions may be stored or transmitted as one or more instructions or codes on a computer readable medium. The computer readable medium includes both a communication medium and a computer storage medium which include a certain medium that facilitates transfer of computer programs from one place to another place. The storage medium may be a certain usable medium that can be accessed by a computer. As an example that is not limitation, such a computer readable medium may include a RAM, ROM, EEPROM, CD-ROM or another optical disk storage, magnetic disc storage or another magnetic storage device, or another medium that can be accessed by a computer, and may be used to transfer or store desired program codes in the form of instructions or data structures. Further, a certain connection may be properly called a computer readable medium. For example, if software is transmitted from a web site, a server, or another remote source using a coaxial cable, optical fiber cable, twisted dual lines, digital subscriber line (DSL), or wireless technology, such as infrared, radio, or ultrahigh frequency, the coaxial cable, optical fiber cable, twisted dual lines, DSL, or wireless technology, such as infrared, radio, or ultrahigh frequency is included in definition of the medium. The disk and disc, as used herein, include a compact disc (CD), laser disc, optical disc, digital versatile disc (DVD), floppy disk, and blu-ray disc. In general, the disk magnetically reproduces data, whereas the disc optically reproduces data by laser. The above-described combinations should also be included in the range of the computer readable medium.

In the case where the embodiments are implemented by program codes or code segments, it should be recognized that the code segment can indicate procedures, functions, subprograms, programs, routines, subroutines, modules, software packages, classes, or instructions, data structures, or a certain combination of program commands. The code segment may be connected to another code segment or a hardware circuit through transfer and/or reception of information, data, arguments, parameters, or memory content. The information, arguments, parameters, and data may be transferred, sent, or transmitted using a certain proper means that includes memory share, message transfer, token transfer, and network transmission. Additionally, in some aspects, steps and/or operations of methods or algorithms may reside as one, a combination, or a set of codes and/or commands on a machine-readable medium and/or a computer readable medium that may be integrated as computer program things.

In the case of software implementation, the above-described technologies may be implemented by modules (e.g., procedures or functions) that perform the above-described functions. Software codes may be stored in memory modules and may be executed by processors. The memory unit may be implemented in the processor or outside the processor, and in this case, the memory unit may be communicably connected to the processor by various means as is known in the art.

In the case of hardware implementation, processing units may be implemented in at least one of an application-specific integrated circuit (ASIC), a digital signal processor (DSP), a digital signal processing device (DSPD), a programmable logic device (PLD), a field programmable gate array (FPGA), a processor, a controller, a microcontroller, a microprocessor, other electronic units that are designed to perform the functions as described above, and their combinations.

As described above, one or more embodiments are exemplified. All possible combinations of components or methods are not described for the purpose of explaining the above-described embodiments, but those skilled in the art may recognize that many additional combinations and substitutions of various embodiments are possible. Accordingly, the above-described embodiments may include all substitutions, modifications, and changes within the true meaning and scope of appended claims. Further, the term "comprises" and/or "composed of" used in the description and claims means that one or more other components, steps, operation and/or existence or addition of devices are not excluded in addition to the described components, steps, operation and/or devices.

As is used herein, the term "estimate" or "estimation" means a process for determining or estimating the system, environment, and/or user's state from one set of observations that is generally seized by events and/or data. The estimation may be used to identify a specific situation or operation, and may generate, for example, probability distribution of states. The estimation may be in probability, and may be calculation of probability distribution of corresponding states based on consideration of the data or events. The estimation may be technologies that are used to construct upper-level events from one set of events and/or data. Such estimation may estimate new events or operations from a set of observed events and/or stored event data, whether the events are closely correlated in time, and whether the events and data come from one or several events and data sources.

Further, the term "component", "module" or "system", as used in the description of the present invention, is not limited thereto, but may include hardware, firmware, hardware and software combination, software, or computer related entity, such as software being executed. For example, a component is not limited to its name, but may be a process that is executed on a processor, a processor, an object, executable execution thread, a program and/or a computer. Exemplarily, an application that is driven on an operation device and an operation device may be components in all. One or more components may reside in a process and/or execution thread, and components may be concentrated into one computer and/or may be distributed between two or more computers. Further, such components may be executed from various kinds of computer readable media in which various kinds of data structures are stored. The components may communicate with each other by a local and/or remote process according to signals having one or more data packets (e.g., data from a local system, another component of a distributed system, and/or a certain component that interacts with other systems by the signal through a network, such as the Internet).

It will be understood that the above-described embodiments are exemplary to help easy understanding of the contents of the present invention and do not limit the scope of the present invention. Accordingly, the scope of the present invention is defined by the appended claims, and it will be construed that all corrections and modifications derived from the meanings and scope of the following claims and the equivalent concept fall within the scope of the present invention.

What is claimed is:

1. A cooperative adaptive cruise control (CACC) system of a subject vehicle to control a driving speed of the subject vehicle, the CACC system comprising:
   a communication unit configured to receive vehicle information including position and driving information from neighboring vehicles using Vehicle to Vehicle (V2V) communications;
   an information collection unit configured to collect driving information of a forward vehicle and vehicle information of the subject vehicle using sensors of the subject vehicle; and
   a controller configured to select a target vehicle to be followed by the subject vehicle based on the vehicle information of the neighboring vehicles that is acquired by the communication unit and the driving information of the forward vehicle that is collected by the information collection unit, to control the driving speed of the subject vehicle based on a target speed of the subject vehicle if the target vehicle to be followed by the subject vehicle is not selected, and to control the driving speed of the subject vehicle based on speed information of the target vehicle, speed information of the subject vehicle, and a target time gap if the target vehicle to be followed by the subject vehicle is selected.

2. The CACC system according to claim 1, wherein the controller controls the driving speed of the subject vehicle.

3. The CACC system according to claim 1, further comprising a driver vehicle interface (DVI) unit configured to receive an input of the target speed or the target time gap or both from a driver and to notify the driver of state information of the CACC system.

4. The CACC system according to claim 1, wherein the controller is further configured to:
   manage a state of the CACC system;
   select the target vehicle to be followed by the subject vehicle based on the vehicle information of the neighboring vehicles that is acquired from the communication unit and the driving information of the forward vehicle that is collected by the information collection unit;
   set a target speed profile based on the target speed of the subject vehicle and an expected driving path if there is not the target vehicle, and to set a target speed profile based on the speed information of the target vehicle, the speed information of the subject vehicle, and the expected driving path if there is the target vehicle; and
   control the driving speed of the subject vehicle according to the set target speed profile.

5. The CACC system according to claim 4, wherein the controller manages the state of the CACC system as one of an off state in which the CACC system does not operate, a standby state in which the CACC system operates, but does not control the driving speed of the subject vehicle, an ACC activation state in which the driving speed of the subject vehicle is controlled using only the information that is acquired from the subject vehicle in a state where there is no vehicle in a region of interest that is connected through V2V communications, and a cooperative activation state in which there is the neighboring vehicle in the region of interest that is connected through the V2V communications, and the driving speed of the subject vehicle is controlled using the information from the neighboring vehicle that is acquired through the V2V communications and the information that is acquired from the subject vehicle.

6. The CACC system according to claim 4, wherein the controller sets a new target speed profile if there is a possibility of collision when the driving speed of the subject vehicle is controlled according to the set target speed profile, and resets the target speed profile based on the speed information of the target vehicle, the speed information of the subject vehicle, and the expected path information.

7. A control method for improving fuel efficiency in a cooperative adaptive cruise control (CACC) system that is provided in a subject vehicle to control a driving speed of the subject vehicle, comprising:
   determining whether to start the CACC system operation;
   setting a target speed profile based on a target speed of the subject vehicle and an expected driving path upon starting of the CACC system operation;

determining whether a target vehicle to be followed by the subject vehicle exists;

controlling the driving speed of the subject vehicle according to the set target speed profile if the target vehicle does not exist as the result of the determination;

comparing a minimum distance Ds that can prevent collision with the target vehicle even if the subject vehicle is driven according to the target speed profile with a current distance Dc to the target vehicle if the target vehicle exists as the result of the determination; and controlling the driving speed of the subject vehicle according to the target speed profile if the current distance Dc is larger than the minimum distance Ds, and performing a fuel efficiency driving if the current distance Dc is smaller than the minimum distance Ds as the result of the comparison, wherein the fuel efficiency driving is performed in consideration of a driving cost Cc in the case of driving to maintain a decelerated current speed after deceleration so that the minimum distance Ds becomes smaller than the current distance Dc, a driving cost Ccontrol in the case of driving according to a new target speed profile that is generated based on the decelerated current speed, a speed of the target vehicle, the speed of the subject vehicle, a minimum driving speed set in the subject vehicle, a distance required to reach the speed Vtarget of the target vehicle through an auxiliary decelerator, and a distance margin according to a deceleration method.

8. The control method according to claim 7, wherein the performing the fuel efficiency driving comprises:

comparing the driving cost Cc in the case of current constant-speed driving after the deceleration of the subject vehicle so that the minimum distance Ds becomes smaller than the current distance Dc, with the driving cost Ccontrol in the case of the driving according to the new target speed profile that is generated based on the decelerated current speed;

maintaining the constant-speed driving at the current speed of the subject vehicle or performing the deceleration through comparison of the current speed of the subject vehicle with the speed of the target vehicle if the driving cost Cc is smaller than the driving cost Ccontrol as the result of the comparison; and comparing the current speed of the subject vehicle with the minimum speed that is set in the subject vehicle if the driving cost Cc is larger than the driving cost Ccontrol as the result of the comparison, wherein the comparing the current speed of the subject vehicle with the minimum speed that is set in the subject vehicle includes performing decelerated driving through the auxiliary decelerator if the current speed of the subject vehicle is higher than the minimum speed that is set in the subject vehicle, and performing the driving at the minimum speed that is set in the subject vehicle if the current speed of the subject vehicle is lower than the minimum speed that is set in the subject vehicle.

9. The control method according to claim 8, wherein the maintaining the constant-speed driving at the current speed of the subject vehicle or performing the deceleration through comparison of the current speed of the subject vehicle with the speed of the target vehicle further comprises:

performing the driving at the current speed of the subject vehicle if the current speed of the subject vehicle is lower than the speed of the target vehicle; and comparing a current distance Dc2 between the subject vehicle and the target vehicle with a sum of a distance Dcruise that is required to reach the driving speed of the target vehicle through the auxiliary decelerator and the distance margin M1 according to the auxiliary decelerator if the current speed of the subject vehicle is larger than the speed of the target vehicle.

10. The control method according to claim 9, wherein the comparing the current distance Dc2 with the sum of the distance Dcruise and the distance margin M1 comprises:

performing the driving at the current speed of the vehicle if the current distance Dc2 is larger than the sum of the distance Dcruise and the distance margin M1; and comparing the current distance Dc2 with a sum of a distance Dbrake that is required to reach the driving speed of the target vehicle through performing braking by a brake and a distance margin M2 that is required during the braking by the brake if the current distance Dc2 is smaller than the sum of the distance Dcruise and the distance margin M1.

11. The control method according to claim 10, wherein the comparing the current distance Dc2 with the sum of the distance Dbrake and the distance margin M2 comprises performing the deceleration through the auxiliary decelerator of the vehicle if the current distance Dc2 is larger than the sum of the distance Dbrake and the distance margin M2, and performing the deceleration through the braking by the brake if the current distance Dc2 is smaller than the sum of the distance Dbrake and the distance margin M2.

12. The control method according to claim 7, wherein the target speed profile is set in consideration of road information on a driving path of the vehicle.

13. The control method according to claim 12, wherein the road information comprises a road curvature, a grade, and a radius of rotation.

* * * * *